US008086725B1

(12) United States Patent
Liang et al.

(10) Patent No.: US 8,086,725 B1
(45) Date of Patent: Dec. 27, 2011

(54) IDENTIFYING ASSOCIATED SYSTEMS SUCH AS ADVERTISING NETWORKS

(75) Inventors: Mike Hsin-Ping Liang, Sunnyvale, CA (US); Johan Deckel, Dublin (IE); Sanjeev Kulkarni, Santa Clara, CA (US); Christine I. Kawasaki, Mountain View, CA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 11/841,306

(22) Filed: Aug. 20, 2007

(51) Int. Cl.
G06F 15/16 (2006.01)
G06F 15/173 (2006.01)

(52) U.S. Cl. ........ 709/224; 709/201; 709/203; 709/218; 709/219

(58) Field of Classification Search ........................ None
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,918,014 A * | 6/1999 | Robinson ...................... | 709/219 |
| 5,948,061 A | 9/1999 | Merriman et al. | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,401,075 B1 | 6/2002 | Mason et al. | |
| 6,985,882 B1 | 1/2006 | Del Sesto | |
| 7,039,599 B2 | 5/2006 | Merriman et al. | |
| 7,136,875 B2 | 11/2006 | Anderson et al. | |
| 7,555,106 B2 * | 6/2009 | Kumar ...................... | 379/114.13 |
| 7,783,719 B2 * | 8/2010 | Miller ........................... | 709/217 |
| 2002/0010759 A1 * | 1/2002 | Hitson et al. .................. | 709/219 |
| 2004/0172332 A1 * | 9/2004 | Merriman et al. .............. | 705/14 |
| 2005/0234775 A1 * | 10/2005 | Pearson et al. ................. | 705/14 |

(Continued)

FOREIGN PATENT DOCUMENTS

WO WO 97/21183 6/1997

OTHER PUBLICATIONS

U.S. Appl. No. 95/001,073, filed Sep. 30, 2004, Reexamination of Stone et al.

(Continued)

*Primary Examiner* — Thu Nguyen
*Assistant Examiner* — Angela Widhalm
(74) *Attorney, Agent, or Firm* — Fish & Richardson P.C.

(57) ABSTRACT

Among other disclosure, a method includes receiving first electronic content configured for displaying a first page in a browser, the first electronic content including a document object model for the first page. Content in the document object model is identified as corresponding to at least one advertisement on the first page, the first page further including page content. Information is extracted from the identified content to be used in identifying an advertising network system that the advertisement links to. An identity of the advertising network system is determined using the extracted information. Second electronic content is generated using the first electronic content and the determined identity of the advertising network system. A second page including the page content of the first page and the advertisement is generated and displayed. On the second page the advertisement is labeled with the determined identity of the advertising network system.

28 Claims, 5 Drawing Sheets

U.S. PATENT DOCUMENTS

| | | | | |
|---|---|---|---|---|
| 2007/0079326 | A1* | 4/2007 | Datta et al. | 725/34 |
| 2007/0156890 | A1* | 7/2007 | Promny | 709/224 |
| 2007/0192369 | A1* | 8/2007 | Gross | 707/104.1 |
| 2007/0239546 | A1* | 10/2007 | Blum et al. | 705/14 |
| 2007/0260736 | A1* | 11/2007 | Miller | 709/227 |
| 2008/0046315 | A1* | 2/2008 | Axe et al. | 705/14 |
| 2008/0066107 | A1* | 3/2008 | Moonka et al. | 725/42 |
| 2008/0103885 | A1* | 5/2008 | Hashim et al. | 705/14 |
| 2008/0120156 | A1* | 5/2008 | Nusbaum | 705/7 |
| 2008/0126515 | A1* | 5/2008 | Chambers et al. | 709/218 |
| 2008/0183579 | A1* | 7/2008 | Avner | 705/14 |
| 2008/0294523 | A1* | 11/2008 | Little | 705/14 |
| 2009/0037254 | A1* | 2/2009 | Colando | 705/10 |
| 2009/0089151 | A1* | 4/2009 | Protheroe et al. | 705/10 |

OTHER PUBLICATIONS

U.S. Appl. No. 95/001,061, filed Sep. 3, 2002, Reexamination of Stone et al.

U.S. Appl. No. 95/001,069, filed Jul. 11, 2002, Reexamination of Dean et al.

U.S. Appl. No. 95/001,068, filed Dec. 7, 2002, Reexamination of Stone et al.

AdForce, Inc., A Complete Guide to AdForce, Version 2.6, 1998.

AdForce, Inc., S-1/A SEC Filing, May 6, 1999.

AdKnowledge Campaign Manager: Reviewer's Guide, AdKnowledge, Aug. 1998.

AdKnowledge Market Match Planner: Reviewer's Guide, AdKnowledge, May 1998.

Ad-Star.com website archive from www. Archive.org, Apr. 12, 1997 and Feb. 1, 1997.

Baseview Products, Inc., AdManagerPro Administration Manual v. 2.0, Dec. 1998.

Baseview Products, Inc., ClassManagerPro Administration Manual v. 1.0.5, Feb. 1, 1997.

Business Wire, "Global Network, Inc. Enters Into Agreement in Principle With Major Advertising Agency," Oct. 4, 1999.

Information Access Technologies, Inc., Aaddzz brochure, "The Best Way to Buy and Sell Web Advertising Space," © 1997.

Information Access Technologies, Inc., Aaddzz.com website archive from www. Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Reexamination of U.S. Patent No. 7,240,025 B2, Control No. 95/001,073.

Request for Reexamination of U.S. Patent No. 6,446,045 B1, Control No. 95/001,061.

Request for Reexamination of U.S. Patent No. 7,249,059 B2, Control No. 95/001,069.

Request for Reexamination of U.S. Patent No. 6,829,587 B2, Control No. 95/001,068.

'Firebug Web Development Evolved' [online]. Get Firebug 2007, [retrieved on Jun. 11, 2007]. Retrieved from the Internet: <URL: http://getfirebug.com/>.

'Firebug Web Development Evolved: Frequently Asked Questions' [online]. Get Firebug 2007, [retrieved on Jun. 11, 2007]. Retrieved from the internet: <URL: http://getfirebug.com/faq.html>.

'Firefox Add-ons: Firebug Version History', [online]. Mozilla 2005-2007, [retrieved on Jun. 11, 2007]. Retrieved from the internet: <URL: https://addons.mozilla.org/en-US/firefox/addons/versions/1843>.

'Mozilla XPInstall' [online]. Mozilla1998-2006 [retrieved on Aug. 20, 2007]. Retrieved from the internet <URL: http://web.archive.org/web/20060813224428/http://www.mozilla.org/projects/xpinstall/>.

'What does Ad Muncher Do?' [online]. Ad Muncher 2006, [retrieved on Aug. 20, 2007]. Retrieved from the internet <URL: http://web.archive.org/web/20060721091328/http://www.admuncher.com/>.

'FilterGate Internet Filtering Solutions' [online]. FilterGate 1997-2005, [retrieved on Aug. 20, 2007]. Retrieved from the internet: <URL: http://web.archive.org/web/20060128110054/filtergate.com/>.

'Ad Hunter Options—Maxthon 1.x' [online]. Maxthon 2007, [retrieved on Aug. 20, 2007]. Retrieved from the internet <URL: http://help.maxthon.com/index.php/Ad_Hunter_Options_-_Maxthon_1.x>.

* cited by examiner

IDENTIFYING ASSOCIATED SYSTEMS SUCH AS ADVERTISING NETWORKS

TECHNICAL FIELD

This document relates to identifying an associated system.

BACKGROUND

In the online environment advertising has taken on a substantial presence. One example of online advertising is that an advertisement is displayed as an identifiable portion or area on the screen, for example in form of a banner or a box. The advertising content can be displayed on a screen where there is also other content.

Advertisement efforts can be evaluated. For example, ads that are published online, for example, sometimes take the form of one or more hyperlinks that the viewer can click on to get more information or to purchase the offered goods or services. These advertising clicks can be aggregated to measure whether the ad generates sufficient interest among the public or to determine advertisement popularity.

SUMMARY

The invention relates to identifying an associated system.

In a first aspect, a computer-implemented method for identifying to a user an advertising network system associated with an advertisement includes receiving first electronic content configured for displaying a first page in a browser, the first electronic content including a document object model for the first page. The method includes identifying content in the document object model as corresponding to at least one advertisement on the first page, the first page further including page content. The method includes extracting information from the identified content to be used in identifying an advertising network system that the advertisement links to. The method includes determining an identity of the advertising network system using the extracted information. The method includes generating second electronic content using the first electronic content and the determined identity of the advertising network system. The method includes configuring a second page for display from the second electronic content. The method includes displaying the second page in the browser, the second page including the page content of the first page and the advertisement, wherein on the second page the advertisement is labeled with the determined identity of the advertising network system.

Implementations can include any, all or none of the following features. The method can further include transmitting the second electronic content to a central reporting server. The method can further include filtering user-identifying data from the second electronic content.

In a second aspect, a computer-implemented method for identifying an associated system to a user includes receiving first electronic content configured for displaying a first page. The method includes identifying at least part of the first electronic content as corresponding to at least one portion of the first page having an associated system. The method includes determining an identity of the associated system using the identified part of the first electronic content. The method includes displaying a second page in which the portion of the first page is labeled with the determined identity of the associated system. The portion of the first page can include an advertisement. The associated system can be an advertising network system that the advertisement links to. The first electronic content can include a document object model for the first page, and the part can be an element of the document object model. The element can be at least one selected from the group consisting of: a link, a tag, a frame, and combinations thereof. The second page can be displayed using second electronic content generated using the first electronic content and the determined identity of the associated system. The second electronic content can be generated by modifying a document object model of the first electronic content. The second electronic content can be generated by generating a new document object model using the document object model of the first electronic content. The method can further include displaying the first page before displaying the second page. The second page can be displayed upon request by a user to whom the first page is displayed. The second page can be generated while the first page is displayed by placing the determined identity on the first page. The first page can be generated using a first canvas in a browser, and the second page can be displayed by generating a second canvas in the browser and overwriting the first canvas with the second canvas. The method can further include presenting an identification area listing any associated system detected for the first page. The identification area can be presented using at least one of a pop-up, an information bubble, an iframe, an overlay, or a browser status bar message. Another portion of the first electronic content corresponding to a page portion can not initially be identified as having another associated system, and the method can further include generating a report for causing contents of the other portion of the first electronic content to be identified as corresponding to the page portion with the other associated system. Generating the report can include receiving a selection of the page portion by a user, identifying the other portion of the first electronic content as corresponding to the page portion, and including the identified other portion of the first electronic content in the report. Generating the report can further include visualizing a document object model of the first page and, upon the user selecting the page portion, visualizing the other portion of the first electronic content, wherein the report allows the user to identify the other associated system based on the visualized other portion of the first electronic content. Multiple associated systems can be identified for the first page, and the method can further include displaying a list on the first page, the list including determined identities for the multiple associated systems. The method can further include transmitting the second electronic content to a central reporting server. The method can further include filtering user-identifying data from the second electronic content.

In a third aspect, a computer program product is tangibly embodied in a computer-readable medium and includes instructions that, when executed, generate on a display device a graphical user interface for identifying an associated system to a user. The graphical user interface includes a page content area presenting content of a page, wherein at least one portion of the page has an associated system. The graphical user interface includes a label that the graphical user interface adds to the content of the page in the page content area, the label associated with the portion and indicating the associated system as having been identified for the portion.

Implementations can include any, all or none of the following features. The portion of the page can be an advertisement and the associated system can be an advertising network system that the advertisement links to. The graphical user interface can further include a selectively displayable area listing any associated system identified for any portion of the page.

Implementations can provide any, all or none of the following advantages. Online advertising can be improved.

Advertisement presence from an advertising network can be detected and visualized to a user. A market share of an advertising network can be determined or estimated. Advertisement click data can be aggregated in a form that protects the privacy of individual users while providing useful information on advertisement popularity, value and advertising network usage.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
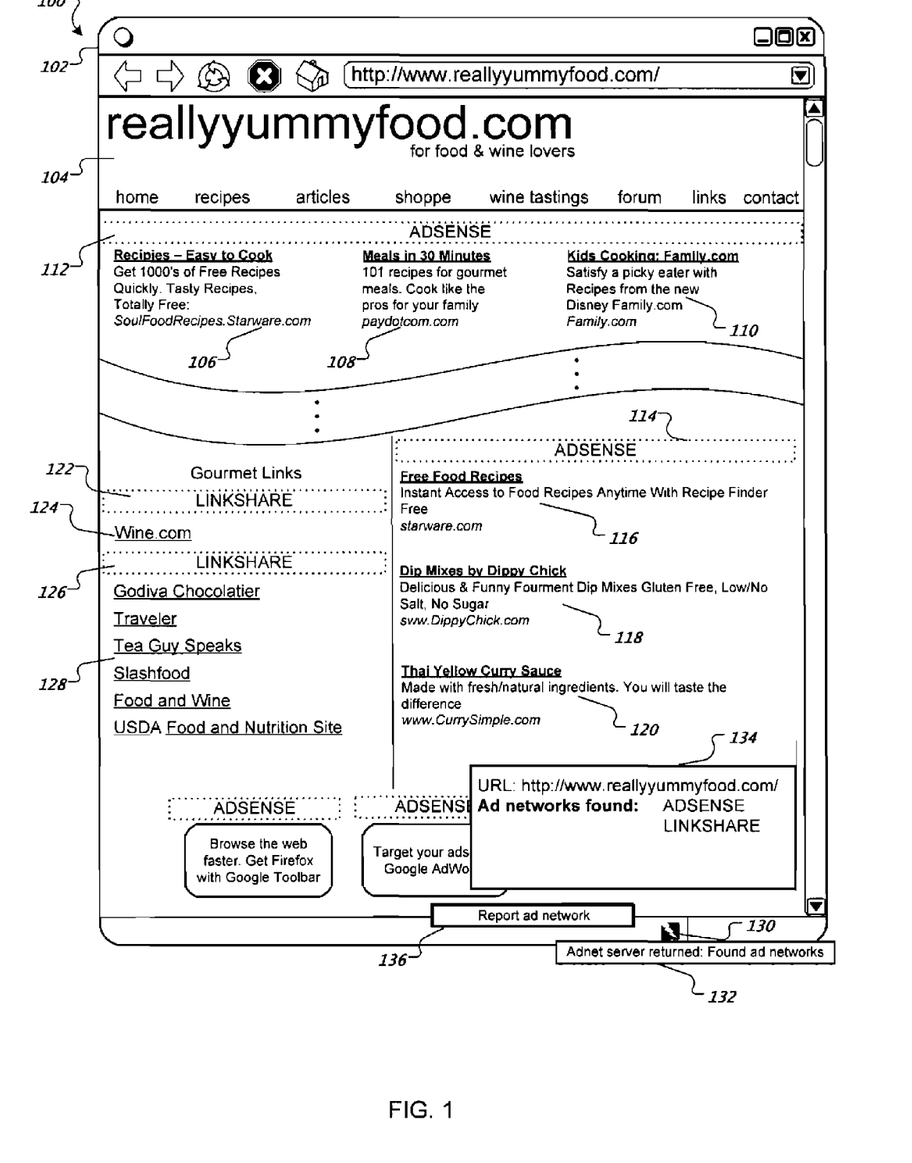
FIG. 1 shows an example of a visual display containing a browser.

FIG. 1 shows a visual display 100 containing a browser 102. The browser 102 currently displays a page 104 containing content, both in the form of main substantive content and one or more related advertisements. In this example, the content of the page 104 includes an advertisement 106, an advertisement 108 and an advertisement 110. Advertisements that are displayed on pages, such as advertisements 106, 108 and 110, can be provided by an advertising network that is separate from a system that provides, or is responsible for, the main substantive content of the page. An advertising network can be a redirecting system between a client and an ultimate destination webpage. The advertising network can provide the content of advertisements that are displayed on a page according to an advertising agreement, to name one example. In other implementations, the page 104 can include other content, and may not include any advertising content.

In some situations, it can be useful for third parties to learn the identity of an advertising network that is providing content for one or more advertisements located on a page. The page 104 is here presented by a system that detects the one or more underlying advertising networks and indicates the one or more networks to a user. In this example, that system has provided the page 104 with a header 112 that indicates the advertising network that is providing the content for the advertisements 106, 108 and 110. For example, the header 112 can be added to the webpage 104 by an advertisement detection system. The advertisement detection system here has determined that the advertisements 106, 108 and 110 are advertisements and that the content for the advertisements 106, 108 and 110 is provided by an advertising network that is here referred to as ADSENSE. The advertisement detection system has inserted the header 112 onto the page 104 to indicate that the advertisements 106, 108 and 110 are advertisements and that the advertising network providing the content for the advertisements 106, 108 and 110 is called ADSENSE. Examples of how the detection can be performed will be described below. In other implementations, content other than an advertisement can be detected and/or labeled on a page.

The page 104 here also contains an advertisement 116, an advertisement 118 and an advertisement 120. The advertisement detection system has inserted a header 114 onto the page 104 to indicate that the advertisements 116, 118 and 120 are advertisements and that their content is also provided by the ADSENSE advertising network.

The page 104 contains a link 124 and a list of links 128 that are also advertisements. The advertisement detection system has therefore identified the advertising network that placed the link 124 and the list of links 128 on the webpage 104. The advertisement detection system program has inserted a header 122 and a header 126 on the page 104 to indicate that the link 124 and the list of links 128 are advertisements and that their content is provided by an advertising network that is here referred to as LINKSHARE. In some implementations, the one or more advertisements, or elements being identified, can take the form of one or more links, tags, frames or a combination thereof.

At the bottom of the browser 102, an advertisement detection system icon 130 is displayed. The icon 130 can be associated with, and operatively connected to, an advertisement detection system program, to name one example. The icon 130 here indicates that advertisement detection system program is running in the system that presents the browser 102. In some implementations, when a user scrolls a cursor over the icon 130, an information box 132 will appear and indicate whether or not advertising networks have been detected for any content on the page 104. As another example, the information box 132 can automatically appear once the advertisement detection system has completed searching for advertisements on the webpage 104 and has added any headers to the webpage 104. The information box 132 can be displayed in response to the system detecting one or more advertising networks. Accordingly, the appearance of information box 132 in some implementations can mark the transition from displaying the original (un-marked) webpage and the resulting webpage that contains headers indicating detected advertising networks.

The user can, for example, left click on the icon 130 to display an information box 134, for example in the form of a popup window. Here, the information box 134 lists the URL of the current page 104 and the name of one or more advertising networks that have been detected for the page. Other information that can be listed in the information box 134 in some implementations includes the number of advertisements detected, the number of advertising networks detected, or a summary of the advertising networks detection, to name a few examples. In some implementations, an identification area such as the information box 134 can be presented using at least one of a pop-up, an information bubble, an iframe, an overlay, or a browser status bar message, to name a few examples.

The user can, for example, right click on the icon 130 to display a pull-down menu 136 with one or more user-selectable commands. The pull-down menu 136 can be used to report undetected advertising networks, for example to a central server or to another user or computer system. For example, a user reviewing the page 104 may notice that an advertisement on the page has not been detected by the system, or that no advertising network has been detected for a particular advertisement, and the user may wish to report this so that the advertisement detection tool can be updated or improved. In some implementations, the advertisement detection system can automatically generate and send the report once the user selects the "report undetected advertising networks" option. In some implementations, the user can input information into the report in order to aid in future advertisement and advertising network detection. In other implementations, the icon 130 can be used for reporting information other than undetected advertising networks.

An advertising network can be detected in any of several ways. For example, the detection program can parse contents of an advertisement and compare them with contents of known advertisement networks in a repository. The best matching network in such a comparison can be registered as the advertising network for the particular advertisement on the page. In other implementations the detection program can analyze one or more navigation targets embedded in the advertisement, such as by determining a resource address that the browser 102 will be directed to if the user clicks on, or otherwise activates, the advertisement. In other implementations, the detection program can analyze scripts, executable code, embeds, or multimedia contents such as audio or video associated with the advertisement, to name a few examples.

Figure 2:
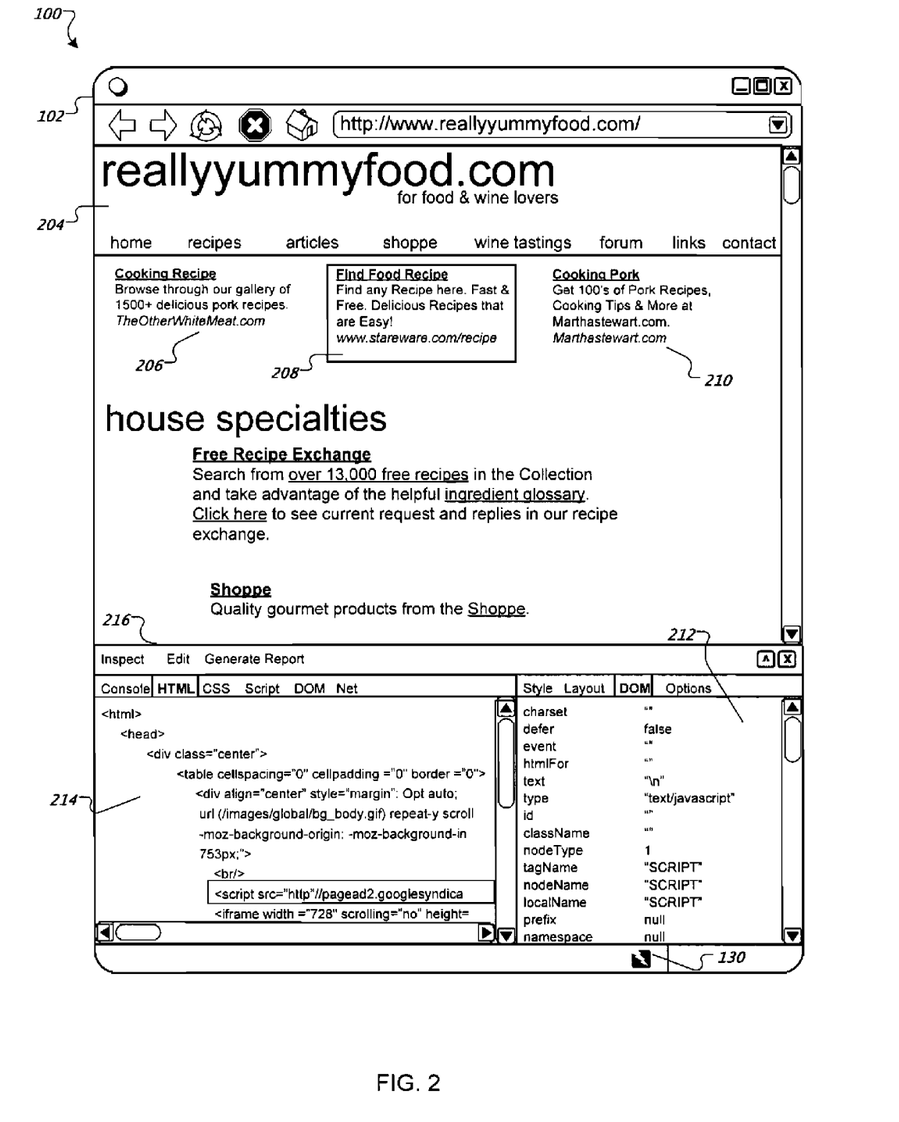
FIG. 2 shows an example of a user reporting an undetected advertisement.

FIG. 2 shows the visual display 100 and the browser 102 from FIG. 1. The web browser 102 displays a webpage 204 that contains one or more advertisements. In this example, the content of webpage 204 includes an advertisement 206, an advertisement 208 and an advertisement 210. The advertisement detection system icon 130 located at the bottom of the browser 102 indicates that advertisement detection system program is running in the system that presents the browser 102. In this example, there is no header located above the advertisements 206, 208 and 210. Since the advertisement detection system program is running, but has not inserted a header above the advertisements 206, 208 and 210, this indicates that the advertisement detection system has not identified the advertisements 206, 208 and 210 as advertisements.

A user who is viewing the page 204 can report the undetected advertisements, for example to a central server or to another user or computer system. First, the user can put the advertisement detection system into a report undetected advertisements mode. In some implementations, this can be done by right clicking on the icon 130 to display a pull-down menu similar to the pull-down menu 136 from FIG. 1 and selecting the "report undetected advertising networks" option. In some implementations, the user could press a specific key-combination or select a command from the browser 102's main menu in order to initiate the report undetected advertisements mode.

Once the user has initiated the report undetected advertisements mode, the user can use the cursor to highlight one or more elements on the page 204, for example by clicking on the elements. In this example, the user has highlighted the advertisement 208. In other implementations, content other than an advertisement can be selected by the user. In some implementations, once the user has highlighted one or more elements, a panel 212 appears at the bottom of the browser 102. The panel 212 can be used to display the DOM (document object model) tree of the highlighted area. The user can then right click on the highlighted advertisement 208 to display a panel 214 and a menu 216. The panel 214 can be populated with html code, script code (such as, for example, JavaScript or another scripting language), or other embedded executable code of the highlighted advertisement 208. The user can then read the code in the panel 214 to see if the code indicates what advertising network has provided the advertisement 208. The user can then select all or some of the code, such as, for example, html code, in the panel 214 and select a "Generate Report" command from the menu 216. In some implementations, the advertisement detection system can automatically generate and send the report once the user selects the "Generate Report" option. In other implementations, the advertisement detection system can automatically populate some of the fields in the report, and the user can input additional information in order to aid in future advertisement and advertising network detection. Information that can be automatically populated in the report can include the URL of the webpage 204, selected code from the panel 214, the full code of the webpage 204, and, in some embodiments, the user name of the user or an ID value associated with the user. Once the report has been generated and the user has finished inputting additional information, the user can submit the report to, for example, a central server, or in some implementations, to another user or computer system.

In some embodiments, it is preferred that the user name of the user, ID and/or other personally-identifying information related to the user can be filtered (at the report generation step and/or at the central server) to enhance the privacy of users while providing useful advertising network reporting information to the central server.

Figure 3:
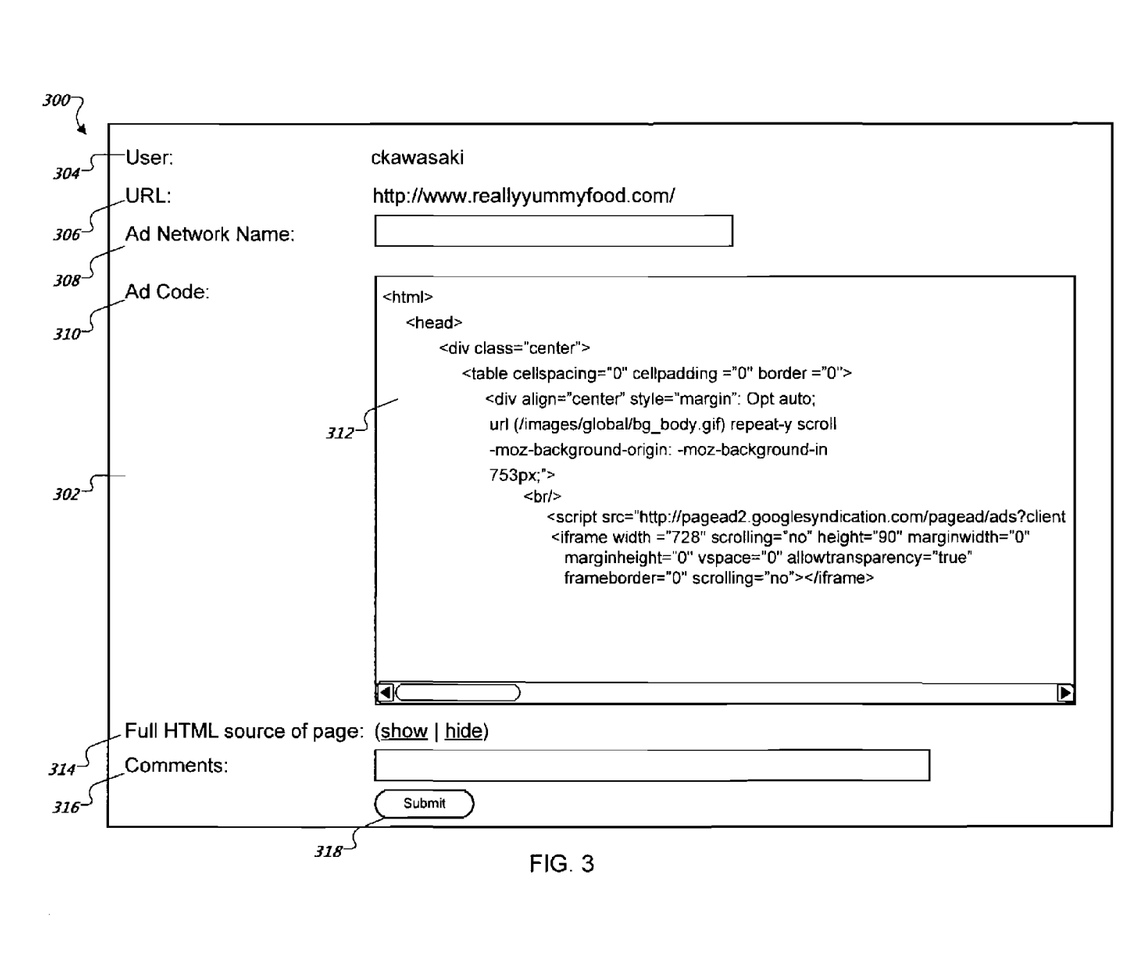
FIG. 3 shows an example of a visual display containing a report form.

FIG. 3 shows a visual display 300 containing a report form 302. The report form 302 is an example of a form that can be generated by an advertisement detection system, such as that mentioned in the descriptions of FIGS. 1 and 2. In some implementations, the report form 302 can be generated when the "report undetected advertising networks" option of the pull-down menu 136 from FIG. 1 is selected or when the "Generate Report" option of the menu 216 from FIG. 2 is selected. Here, the report form 302 is used to report advertisements that have not been detected by advertisement detection system so that the advertisement detection can be updated or improved. In some implementations, the report form 302 could be used to report advertisements that have been detected, where the advertising network responsible for providing the advertisement has not been identified or has been incorrectly identified. In other implementations, content other than an advertisement can be reported using the report form 302.

In the example depicted in FIG. 2, the report form 302 contains a user field 304. The user field 304 contains the username of the user who is reporting the undetected advertisement. This way the user can be contacted later. Here, the user field 304 has been automatically populated with the current user's username. In some implementations, other examples of user identification that can be used to populate the user field 304 include employee id number, e-mail address or name. In some implementations, the user can input or change the value of the user field 304.

As noted previously, in some embodiments the user field 304 and related user data can be filtered to enhance the privacy of users of the system. For example, user field 304 can be filtered out completely, can be associated with a unique report ID that is not associated with the user, can be filtered out upon aggregation of data for ad network reporting, can be maintained or excluded based on user privacy and/or reporting preferences, or can be stored separately in a time-limited, identity-filtered or restricted-access fashion.

The report form 302 contains a URL field 306. Here, the URL field 306 is automatically populated with the URL of the page being reported. In some implementations, the user can input the URL of the page being reported.

The report form 302 contains an Ad Network Name field 308. In some situations, the user may be able to determine the identity of the advertising network that is responsible for providing the content of the advertisement being reported by looking at, for example, the html code of the advertisement. The user may recognize a link as belonging to a particular advertising network or may be able to identify the advertising network in some other manner. In these instances, the user can input the name of the advertising network into the Ad Network Name field 308. In some implementations, if the user is unable to identify the advertising network responsible for providing the content of the advertisement being reported, the user can leave the Ad Network Name field 308 empty. In implementations where the reporting does not relate to an advertisement, the field 308 can receive information about a system that is associated with content on the page.

In the implementation shown, the report form 302 contains an Ad Code field 310. Here, the Ad Code field 310 is automatically populated with the html code of the advertisement being reported. In other implementations, the Ad Code field 310 can be populated with script code, other embedded executable code, or a combination of various types of code. In some implementations, this code represents the code that had been selected by the user in the panel 214 in FIG. 2. The code of the advertisement being reported can be used to confirm or reject the identity of the advertising network reported by the user in the Ad Network Name field 308. If the user has not entered a value or has entered an incorrect advertising network in the Ad Network Name field 308, the advertisement code can be used to determine the identity of the advertising network that is responsible for providing the content of the advertisement being reported. In implementations where the reporting does not relate to an advertisement, the field 310 can be populated with code for content that has been identified on the page.

In the implementation shown, the report form 302 contains a Full HTML source of page field 314. The field 314 provides access to the full html source code of the page that contains the advertisement being reported. Here, the field 314 has options to show or hide the HTML source code of the page. In this example, the HTML source code is currently hidden. In some implementations, the full HTML source code of the page can be used to determine the identity of the advertising network that is responsible for providing the content of the advertisement being reported when the html code of the advertisement does not provide enough information to accurately determine the identity of the advertising network.

If the page is not on an HTML network, but is, for example, part of a multimedia audio or video stream, embedded ads in a multi-player game network, or in broadcast media, reporting can be modified to represent the source location in a manner acceptable for such a network.

The report form 302 contains a Comments field 316. The user can use the Comments field 316 to enter any additional information about the advertisement being reported that may help in updating or improving advertisement detection. For example, the user could include information about the subject matter of the page, the subject matter of the advertisement, an indication of how the advertising network (or other associated system) was identified, or other characteristics of the page and advertisement.

The report form 302 contains a Submit button 318. Once the user has finished inputting any additional information into the report form 302 that was not automatically populated, the user can click on the Submit button 318 to submit the report, for example to a central server or to another user or computer system.

Figure 4:
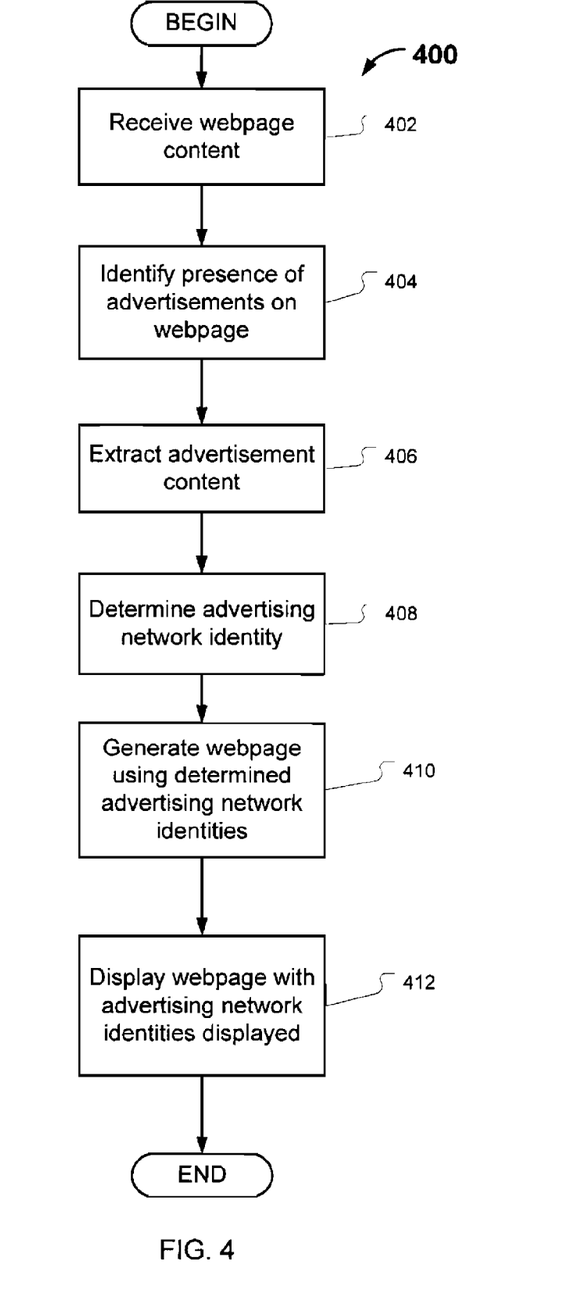
FIG. 4 shows an example of a flowchart of a method for detecting an advertisement and identifying an advertising network.

FIG. 4 is a flowchart of a method 400 for detecting one or more advertisements on a page and identifying the advertising network or networks that have provided the content for the one or more detected advertisements. In the example, the method 400, at 402, receives the content of a page. The method 400 can receive this content in the form of html code or in some other form. At 404, the method 400 identifies the presence of one or more advertisements on the received page. In other implementations, content other than an advertisement can be detected on a page.

At 406, the method 400 extracts the content of the one or more identified advertisements to be used in identifying the advertising network or networks that have provided the content for the one or more identified advertisements. At 408, the method 400 determines the identity of the one or more advertising networks that have provided the content for the one or more identified advertisements.

The method 400, at 410, then generates a second page using the content of the received page and the determined advertising network identity or identities. At 412, the method 400 displays the second generated page with the advertising network identity displayed together with the original content of the received page. In some implementations, the identity of each advertising network can be displayed in a header above each of the one or more identified advertisements, as shown in FIG. 1. In some implementations, the second generated page can be automatically displayed. In some implementations, the second generated page can be displayed upon the request of a user. In some implementations, the first received page is displayed before the second generated page is displayed. In some implementations, the first page is displayed by generating a first canvas in a browser. The second page is then displayed by generating a second canvas in the browser and overwriting the first canvas with the second canvas. In some implementations, the second page is generated by modifying a document object model of the first page or by generating a new document object model using the document object model of the first page.

In some implementations, transmitting the second generated page can be transmitted to a central reporting server, for example over a network such as the internet. In so doing, user-identifying data can be filtered from the second generated page.

Figure 5:
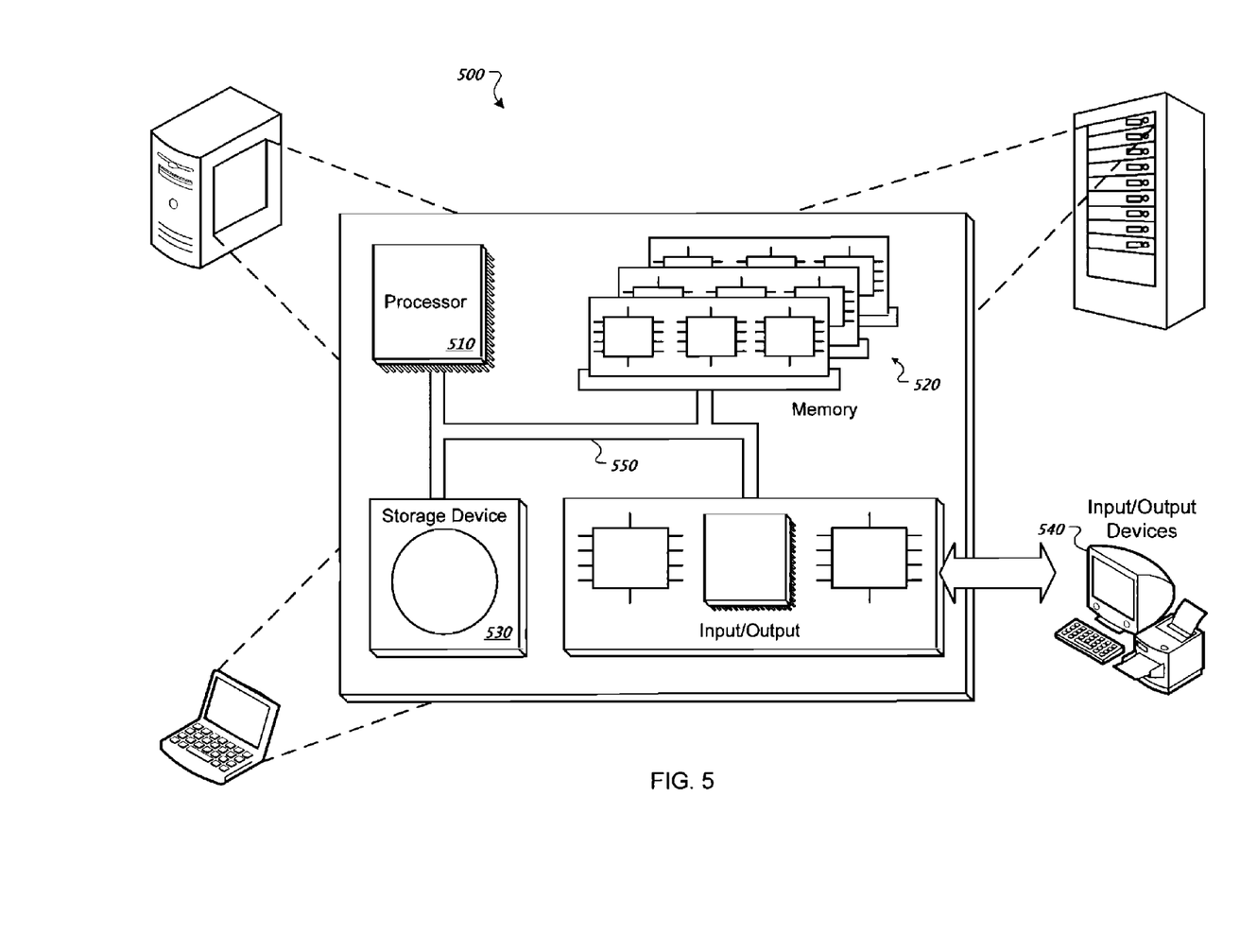
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in a computer-readable medium, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for identifying to a user an advertising network system associated with an advertisement, the method comprising:
   receiving first electronic content configured for displaying a first page in a browser, the first electronic content including a document object model for the first page;
   identifying content in the document object model as corresponding to at least one advertisement on the first page, the first page further including page content;
   extracting information from the identified content to be used in identifying an advertising network system that the advertisement links to, wherein the advertising network system obtains the advertisement for distribution on behalf of an advertiser and distributes the advertisement;
   determining an identity of the advertising network system using the extracted information;
   generating second electronic content using the first electronic content and the determined identity of the advertising network system;
   configuring a second page for display from the second electronic content; and
   displaying the second page in the browser, the second page including the page content of the first page and the advertisement, wherein on the second page the advertisement is labeled with a label that is not displayed with the first page, the label including the determined identity of the advertising network system.

2. The computer-implemented method of claim 1, further comprising:
   transmitting the second electronic content to a central reporting server.

3. The computer-implemented method of claim 1, further comprising:
   filtering user-identifying data from the second electronic content.

4. A computer-implemented method for identifying an associated system to a user, the method comprising:
   receiving first electronic content configured for displaying a first page;
   identifying at least part of the first electronic content as corresponding to at least one portion of the first page having an associated system that obtains at least the identified part of the first electronic content for distribution on behalf of a content provider and distributes the identified part of the first electronic content;
   determining an identity of the associated system using the identified part of the first electronic content; and
   displaying a second page in which at least the portion of the first page is displayed and labeled with a label that is not displayed with the first page, the label including the determined identity of the associated system.

5. The computer-implemented method of claim 4, wherein the portion of the first page includes an advertisement.

6. The computer-implemented method of claim 5, wherein the associated system is an advertising network system that the advertisement links to.

7. The computer-implemented method of claim 4, wherein the first electronic content includes a document object model for the first page, and wherein the part is an element of the document object model.

8. The computer-implemented method of claim 7, wherein the element is at least one selected from the group consisting of: a link, a tag, a frame, and combinations thereof.

9. The computer-implemented method of claim 4, wherein the second page is displayed using second electronic content generated using the first electronic content and the determined identity of the associated system.

10. The computer-implemented method of claim 9, wherein the second electronic content is generated by modifying a document object model of the first electronic content.

11. The computer-implemented method of claim 9, wherein the second electronic content is generated by generating a new document object model using the document object model of the first electronic content.

12. The computer-implemented method of claim 4, further comprising displaying the first page before displaying the second page.

13. The computer-implemented method of claim 12, wherein the second page is displayed upon request by a user to whom the first page is displayed.

14. The computer-implemented method of claim 12, wherein the second page is generated while the first page is displayed by placing the label including the determined identity on the first page.

15. The computer-implemented method of claim 12, wherein the first page is generated using a first canvas in a browser, and wherein the second page is displayed by generating a second canvas in the browser and overwriting the first canvas with the second canvas.

16. The computer-implemented method of claim 4, further comprising presenting an identification area listing any associated system detected for the first page.

17. The computer-implemented method of claim 16, wherein the identification area is presented using at least one of a pop-up, an information bubble, an iframe, an overlay, or a browser status bar message.

18. The computer-implemented method of claim 12, wherein another portion of the first electronic content corresponding to a page portion is not initially identified as having another associated system, further comprising generating a report for causing contents of the other portion of the first electronic content to be identified as corresponding to the page portion with the other associated system.

19. The computer-implemented method of claim 18, wherein generating the report comprises receiving a selection of the page portion by a user, identifying the other portion of the first electronic content as corresponding to the page portion, and including the identified other portion of the first electronic content in the report.

20. The computer-implemented method of claim 19, wherein generating the report further comprises displaying a document object model of the first page and, upon the user selecting the page portion, displaying the other portion of the first electronic content, wherein the report allows the user to identify the other associated system based on the displayed other portion of the first electronic content by entering an identification of the other associated system.

21. The computer-implemented method of claim 4, wherein multiple associated systems are identified for the first page, further comprising displaying a list on the first page, the list including determined identities for the multiple associated systems.

22. The computer-implemented method of claim 4, further comprising:
    transmitting the second electronic content to a central reporting server.

23. The computer-implemented method of claim 22, further comprising:
    filtering user-identifying data from the second electronic content.

24. A computer program product tangibly embodied in a machine-readable storage device, the computer program product including instructions that, when executed, generate on a display device a graphical user interface for identifying an associated system to a user, the graphical user interface comprising:
    a page content area presenting content of a page, wherein at least one portion of the page has an associated system that obtains the at least one portion for distribution on behalf of a content provider and distributes the at least one portion; and
    a label that the graphical user interface adds to the content of the page in the page content area, the label associated with the portion and indicating the associated system as having been identified for the portion.

25. The computer program product of claim 24, wherein the portion of the page is an advertisement and the associated system is an advertising network system that the advertisement links to.

26. The computer program product of claim 24, wherein the graphical user interface further includes a selectively displayable area listing any associated system identified for any portion of the page.

27. The computer-implemented method of claim 1, wherein the advertising network system is configured to distribute advertisements on behalf of multiple different advertisers for publication on one or more of the first page and other pages, and wherein the advertising network system obtains the advertisement from one of the advertisers.

28. The computer-implemented method of claim 27, wherein the advertisement as distributed by the advertising network system includes an identity of the advertiser.

* * * * *

UNITED STATES PATENT AND TRADEMARK OFFICE
CERTIFICATE OF CORRECTION

| | | |
|---|---|---|
| PATENT NO. | : 8,086,725 B1 | Page 1 of 1 |
| APPLICATION NO. | : 11/841306 | |
| DATED | : December 27, 2011 | |
| INVENTOR(S) | : Liang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 219 days.

Signed and Sealed this

Seventeenth Day of April, 2012

David J. Kappos
*Director of the United States Patent and Trademark Office*